May 25, 1926.  1,586,411
J. CSIMA
AUTOMATICALLY ROCKING BABY CARRIAGE
Filed June 29, 1925   3 Sheets-Sheet 1

INVENTOR
Julius Csima
BY
ATTORNEY

WITNESS:

May 25, 1926.
J. CSIMA
AUTOMATICALLY ROCKING BABY CARRIAGE
Filed June 29, 1925   3 Sheets-Sheet 2
1,586,411
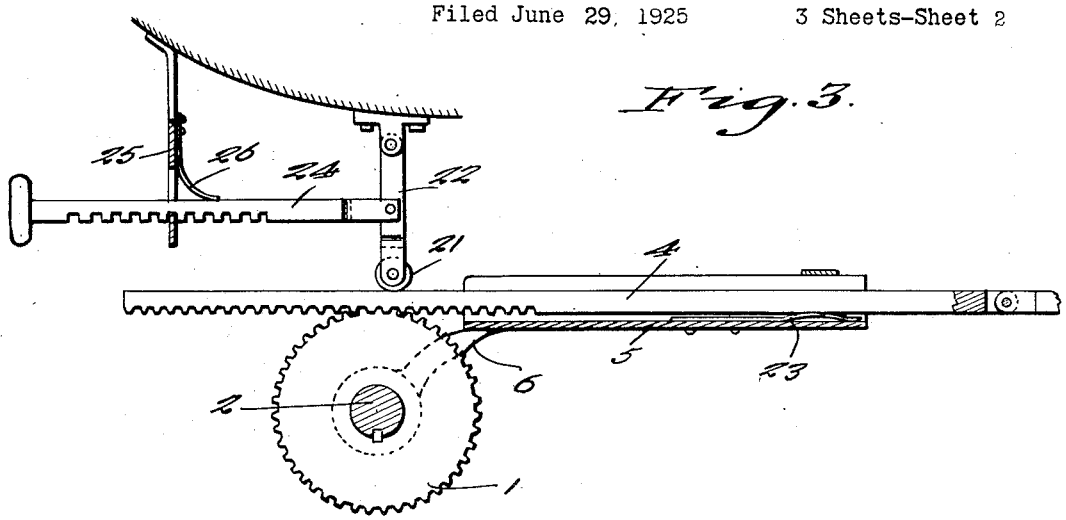
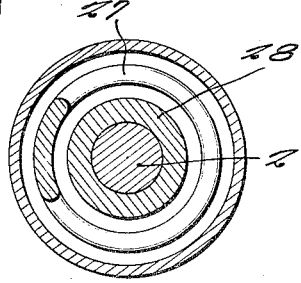
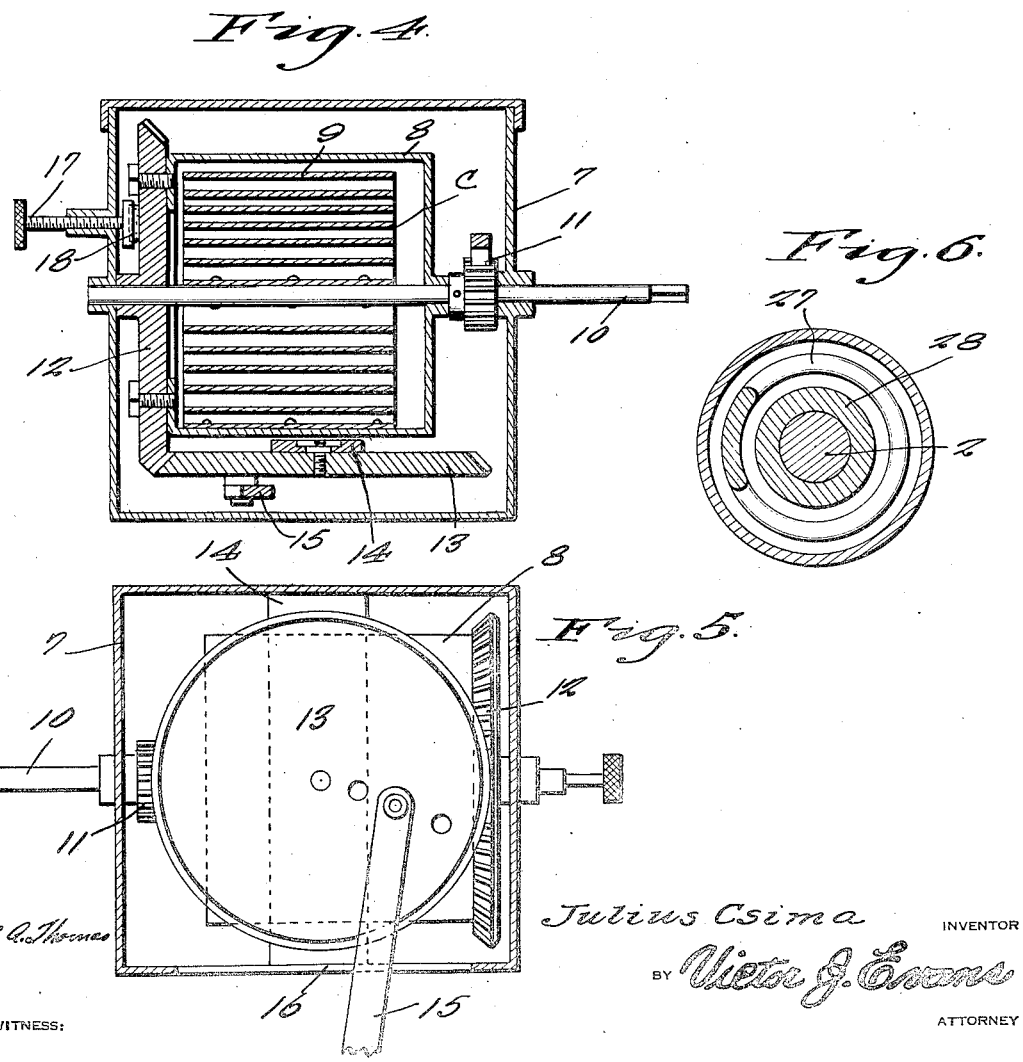
Julius Csima
INVENTOR
BY Victor J. Evans
ATTORNEY May 25, 1926.
J. CSIMA
1,586,411
AUTOMATICALLY ROCKING BABY CARRIAGE
Filed June 29, 1925      3 Sheets-Sheet 3
*Fig. 7.*
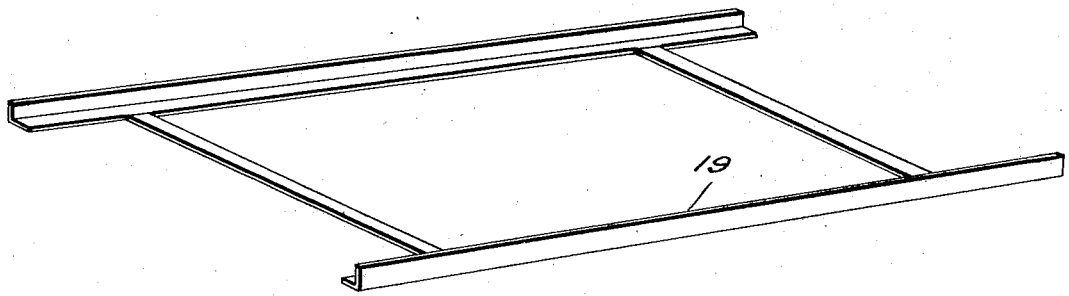
*Fig. 8.*
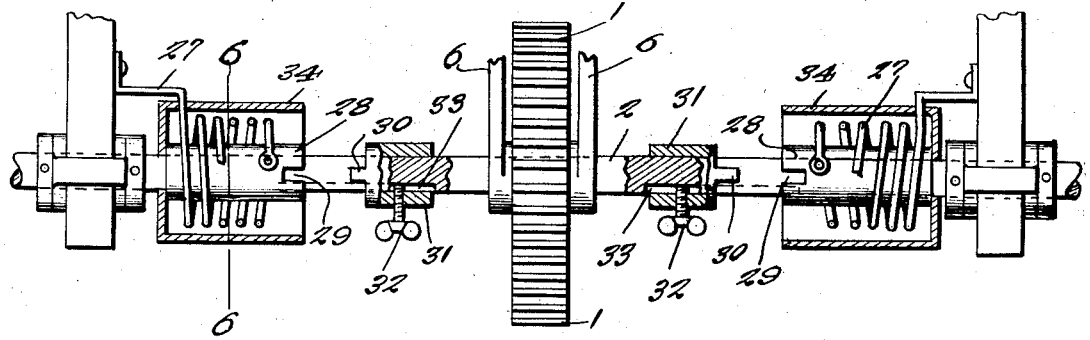
*Fig. 9.*
Julius Csima INVENTOR
BY Victor J. Evans
ATTORNEY Patented May 25, 1926.

1,586,411

UNITED STATES PATENT OFFICE.

JULIUS CSIMA, OF MILWAUKEE, WISCONSIN.

AUTOMATICALLY-ROCKING BABY CARRIAGE.

Application filed June 29, 1925. Serial No. 40,376.

This invention relates to means for moving a baby carriage back and forth automatically, the general object of the invention being to provide a rack bar on the carriage which engages a pinion on one of the axles thereof with means for reciprocating the rack bar to rotate the axle and the wheels attached thereto, first in one direction and then in another.

Another object of the invention is to provide a track for the carriage and also to provide means for rendering the driving means inoperable so that the carriage can be moved by hand, when desired.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 3 is a fragmentary sectional view showing the means for rendering the driving means operable and inoperable, as desired.

Figure 4 is a sectional view through the spring motor.

Figure 5 is a bottom plan view with the casing of the spring motor in section.

Figure 6 is a section on line 6—6 of Figure 8.

Figure 7 is a fragmentary view of the track.

Figure 8 is a view of the front axle with the parts associated therewith and with parts in section.

Figure 9 is a view of an electric motor, which may be used in place of the spring motor.

Figure 1:
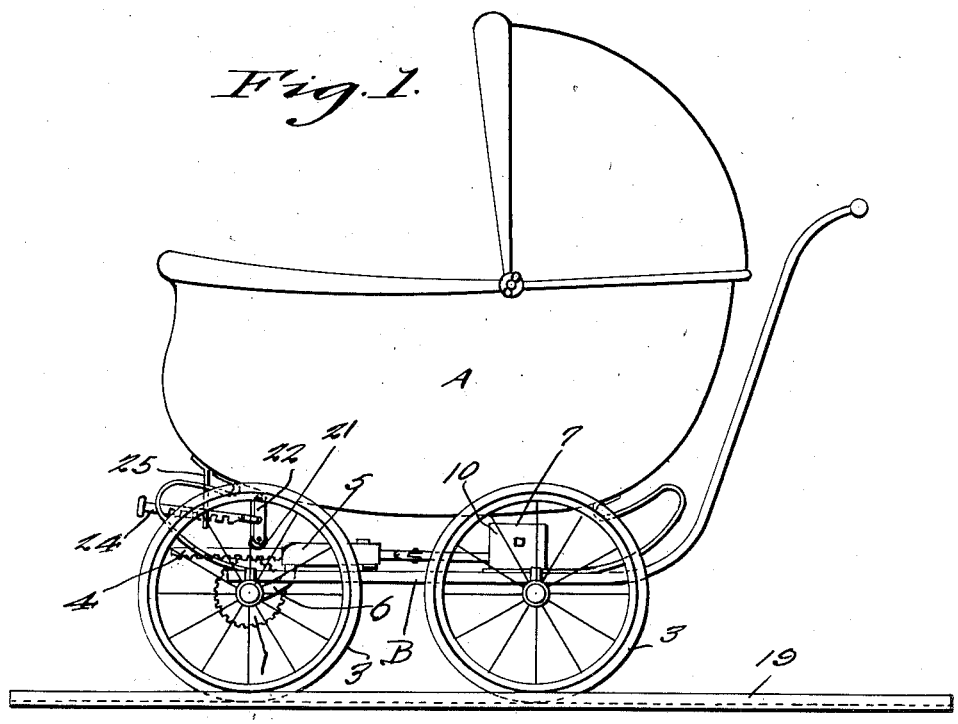
Figure 1 is a side view of a baby carriage constructed in accordance with this invention.
Figure 2:
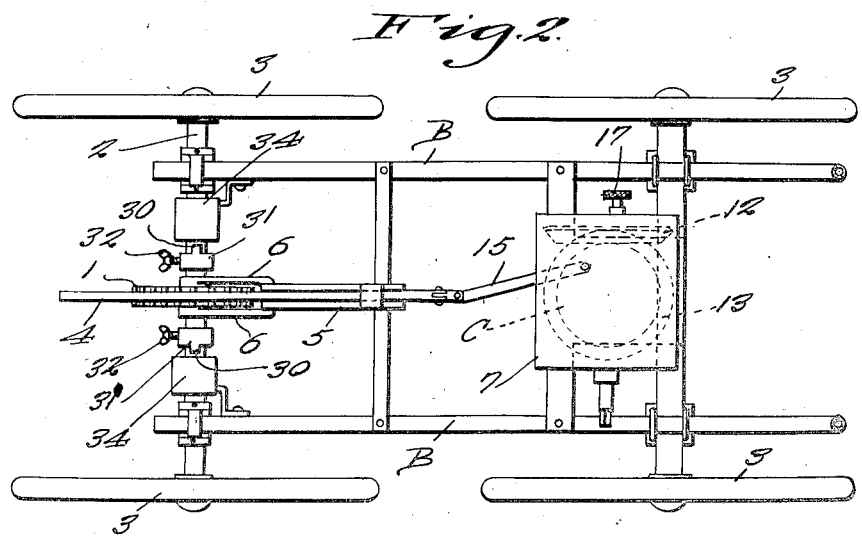
Figure 2 is a plan view of the running gear thereof and showing the driving means in place.

As shown in these views, a pinion 1 is fastened to the front axle 2 of the baby carriage A, the wheels 3 being fastened to the front and rear axles, with the axles rotatably mounted in the frame B of the carriage. A rack bar 4 engages the pinion and is guided in its movement by the guideway 5 which is supported from the frame and has its front end attached to the arms 6 which have bearings formed at their lower ends to receive the front axle 2. A motor casing 7 is supported at the rear of the frame B and contains a spring motor C which consists of a casing 8, a spring 9 which has one end attached to the casing and its other end to the shaft 10 which passes through both casings and has one end squared to receive a key so that the shaft can be rotated to wind up the spring. Ratchet mechanism 11 prevents retrograde movement of the shaft 10 and a beveled gear 12 is rotatably mounted on the shaft and is bolted to the casing 8. This gear meshes with a similar gear 13 which is carried by a spider 14 and carries a crank arm 15 which is pivotally connected to the rack bar so that the rotary movement of the motor will act to reciprocate the rack bar. The crank arm passes through a slot 16 in the casing 7 and said casing carries a turn screw 17 which has a pad 18 for engaging the gear 12 so that by turning the screw inwardly, the pad will act to brake the wheel and thus check or wholly prevent movement of the spring motor. I provide a track 19 upon which the wheels of the vehicle run and it will be seen that by winding up the spring motor and loosening the brake, the motor will cause the rack bar to reciprocate, and the engagement of the rack bar with the pinion will rotate the front axle 2 and the wheels 3 first in one direction and then in the other, so that the vehicle will be moved backwards and forwards on the track so that the infant will be "rocked" by mechanical means.

Instead of using a spring motor, I may use an electric motor, as shown at 20 in Figure 9, the shaft of this motor being connected with the beveled gear 12' which is similar to the gear 12 which is driven by the spring motor.

A roller 21 carried by an arm 22 which is pivoted to a part of the carriage, engages the rack bar and holds it in mesh with the pinion 1. A spring 23 in the bottom of the guideway 5, will move the rack bar out of mesh with the pinion 1 when the arm 22 has been rocked from a vertical position by means of the hand bar 24 which is pivoted to the arm 22 and has its notched part passing through a hole in a hanger 25 carried by the vehicle, a spring 26 holding the bar 24 in any one of its notches in engagement with the bottom wall of the hole. Thus the arm 22 can be shifted manually to free the rack bar from the roller, so that the spring 23 will raise the rack bar out of engagement with the pinion 1 which will render the invention inactive and permit the vehicle to be used in the ordinary manner.

In order to prevent shocks being transmitted to the vehicle at the beginning of each stroke of the rack bar, 1 provide shock absorbers adjacent each end of the front axle, each shock absorber comprising a spring 27 which has one end passing through the frame of the vehicle and its other end passing through a sleeve 28, around which the spring is coiled and which is rotatably mounted on the axle. This sleeve is provided with the notches 29 for receiving the tongues 30 on a collar 31 which is slidably mounted on the shaft and which is held against rotary movement by the set screw 32 passing through the collar and engaging a groove 33 formed in the axle. Thus by moving the collars 31 outwardly, the tongues can be inserted in the notches 29 so that the collars 28 will be caused to rotate with the axle. The springs 27 are oppositely wound so that one spring will be unwinding while the other is winding, due to the rotation of the axle. These springs will act to prevent shock being transmitted to the vehicle by the changes of movement of the rack bar. Each spring and its sleeve is enclosed by a stationary housing 34.

From the foregoing, it will be seen that I have provided effective means for mechanically moving a baby carriage back and forth, with means for preventing shocks being transmitted to the vehicle at the ends of its movements and with means for rendering the invention inactive when the carriage is to be moved by hand.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with a baby carriage having axles, a pinion mounted on one axle for rotation therewith, a rack-bar engaging with said pinion, a source of power for operating said rack bar in alternate directions, a lever pivotally secured to the carriage and engageable in one position to hold said rack bar in mesh with said pinion, a guideway for said rack-bar, and means in said guideway engaging said rack-bar to remove same from mesh with the pinion upon movement of the lever from engagement with the rack-bar.

2. A vehicle having axles for reception of wheels, a pinion mounted on one of said axles for rotation therewith, a rack-bar for meshing engagement with said pinion to alternately rotate same, a guideway secured to said axle, for reception of said rack-bar, means pivotally connected to said carriage for holding said rack bar in mesh with the pinion, and means in said guideway for forcing said rack-bar out of mesh with respect to the pinion upon movement of said pivoted means from engagement with the rack-bar.

In testimony whereof I affix my signature.

JULIUS CSIMA.